(12) United States Patent
Pelletier et al.

(10) Patent No.: US 10,459,107 B2
(45) Date of Patent: Oct. 29, 2019

(54) WELL MONITORING WITH AUTONOMOUS ROBOTIC DIVER

(71) Applicant: Halliburton Energy Services, Inc., Houston, TX (US)

(72) Inventors: Michael T. Pelletier, Houston, TX (US); David L. Perkins, The Woodlands, TX (US); Li Gao, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 110 days.

(21) Appl. No.: 15/515,974

(22) PCT Filed: Nov. 13, 2014

(86) PCT No.: PCT/US2014/065500
§ 371 (c)(1),
(2) Date: Mar. 30, 2017

(87) PCT Pub. No.: WO2016/076875
PCT Pub. Date: May 19, 2016

(65) Prior Publication Data
US 2017/0299758 A1    Oct. 19, 2017

(51) Int. Cl.
*E21B 47/00* (2012.01)
*G01V 3/18* (2006.01)
(Continued)

(52) U.S. Cl.
CPC ............ *G01V 3/18* (2013.01); *E21B 47/0005* (2013.01); *E21B 47/102* (2013.01); *G01V 1/22* (2013.01);
(Continued)

(58) Field of Classification Search
CPC .. E21B 2023/008; E21B 47/00; E21B 44/005; F16L 2101/30; F16L 55/32; B25J 9/065
See application file for complete search history.

(56) References Cited

U.S. PATENT DOCUMENTS

| 4,399,692 A | 8/1983 | Hulsing et al. |
| 6,112,809 A * | 9/2000 | Angle .................. E21B 4/18 166/50 |

(Continued)

OTHER PUBLICATIONS

International Search Report and Written Opinion for Application No. PCT/US2014/065500 dated Jul. 23, 2015.

*Primary Examiner* — Kipp C Wallace
(74) *Attorney, Agent, or Firm* — John Wustenberg; C. Tumey Law Group

(57) ABSTRACT

A monitoring apparatus for use in a well can include multiple segments, the segments comprising at least one buoyancy control device, at least one communication device, and at least one well parameter sensor. A method of communicating in a subterranean well can include installing at least one monitoring apparatus in the well, the monitoring apparatus including a communication device, a well parameter sensor and a buoyancy control device, and the communication device communicating with another communication device. A well monitoring system can include at least one monitoring apparatus disposed in a wellbore, the monitoring apparatus comprising multiple segments, the segments including at least one buoyancy control device, at least one well parameter sensor, and at least one communication device.

20 Claims, 8 Drawing Sheets

(51) Int. Cl.
*G01V 1/22* (2006.01)
*G01V 11/00* (2006.01)
*E21B 47/10* (2012.01)
*G01V 3/38* (2006.01)

(52) U.S. Cl.
CPC ............... *G01V 3/38* (2013.01); *G01V 11/00* (2013.01); *E21B 47/00* (2013.01)

(56) References Cited

U.S. PATENT DOCUMENTS

| | | | |
|---|---|---|---|
| 6,378,627 B1 | 4/2002 | Tubel et al. | |
| 6,405,798 B1* | 6/2002 | Barrett | E21B 17/028 166/250.01 |
| 6,462,672 B1* | 10/2002 | Besson | E21B 47/00 340/853.2 |
| 6,766,703 B1* | 7/2004 | Kluth | E21B 23/08 73/152.28 |
| 6,845,819 B2 | 1/2005 | Barrett et al. | |
| 7,362,097 B2* | 4/2008 | Brown | G01N 27/82 324/220 |
| 7,845,440 B2* | 12/2010 | Jacobsen | B62D 57/04 180/9.46 |
| 8,193,946 B2 | 6/2012 | Sinanovic et al. | |
| 8,317,555 B2* | 11/2012 | Jacobsen | B63C 11/52 114/312 |
| 8,571,711 B2* | 10/2013 | Jacobsen | B08B 9/045 180/9.21 |
| 8,935,014 B2* | 1/2015 | Jacobsen | F41H 13/00 700/245 |
| 9,359,841 B2 | 6/2016 | Hall | |
| 9,777,568 B2* | 10/2017 | Danisch | E02D 31/00 |
| 10,001,007 B2* | 6/2018 | Pelletier | E21B 47/065 |
| 10,151,161 B2* | 12/2018 | Pelletier | E21B 47/12 |
| 2003/0094281 A1* | 5/2003 | Tubel | E21B 47/00 166/250.03 |
| 2004/0173116 A1* | 9/2004 | Ghorbel | F16L 55/26 104/138.2 |
| 2006/0070775 A1* | 4/2006 | Anhalt | B08B 9/045 180/9.1 |
| 2009/0248202 A1* | 10/2009 | Osuka | A61B 1/0055 700/245 |
| 2009/0271117 A1* | 10/2009 | Ayoub | E21B 41/0035 702/11 |
| 2010/0317244 A1* | 12/2010 | Jacobsen | B63C 11/34 440/12.63 |
| 2013/0014932 A1* | 1/2013 | Di Renzo | E21B 47/01 166/53 |
| 2013/0186645 A1* | 7/2013 | Hall | E21B 23/00 166/382 |

* cited by examiner

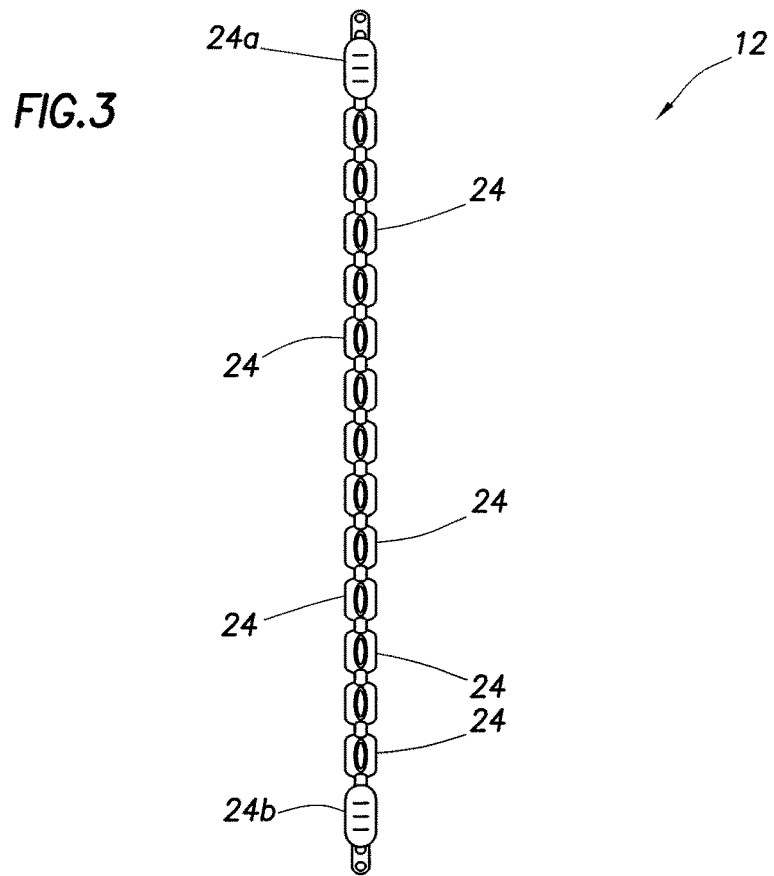
FIG.3
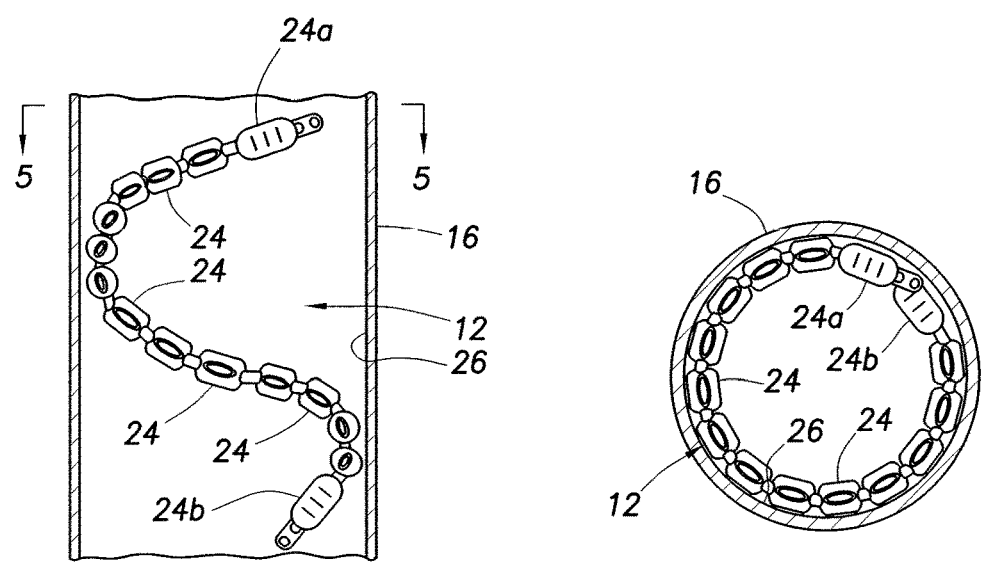
FIG.4
FIG.5

WELL MONITORING WITH AUTONOMOUS ROBOTIC DIVER

TECHNICAL FIELD

This disclosure relates generally to equipment utilized and operations performed in conjunction with a subterranean well and, in one example described below, more particularly provides for monitoring in a well using an autonomous robotic diver apparatus.

BACKGROUND

It is beneficial to be able to monitor various parameters in wells, and to communicate accumulated parameter data to surface or another remote location. For example, if a section of a well has been abandoned, it can be useful to know whether there is cross-flow between perforations, or leakage or invasion of fluids in the abandoned section. In another example, flow, cement and casing integrity, etc., could be monitored in a producing section of a well. Therefore, it will be appreciated that improvements are continually needed in the art of well monitoring.

BRIEF DESCRIPTION OF THE DRAWINGS

FIG. 3 is a representative side view of an example of a monitoring apparatus that may be used in the system and method, the monitoring apparatus being depicted in a linear configuration thereof.

FIG. 4 is a representative partially cross-sectional view of the monitoring apparatus in a helical arrangement in a casing.

FIG. 5 is a representative cross-sectional view, taken along line 5-5 of FIG. 4.

DETAILED DESCRIPTION

Figure 1:
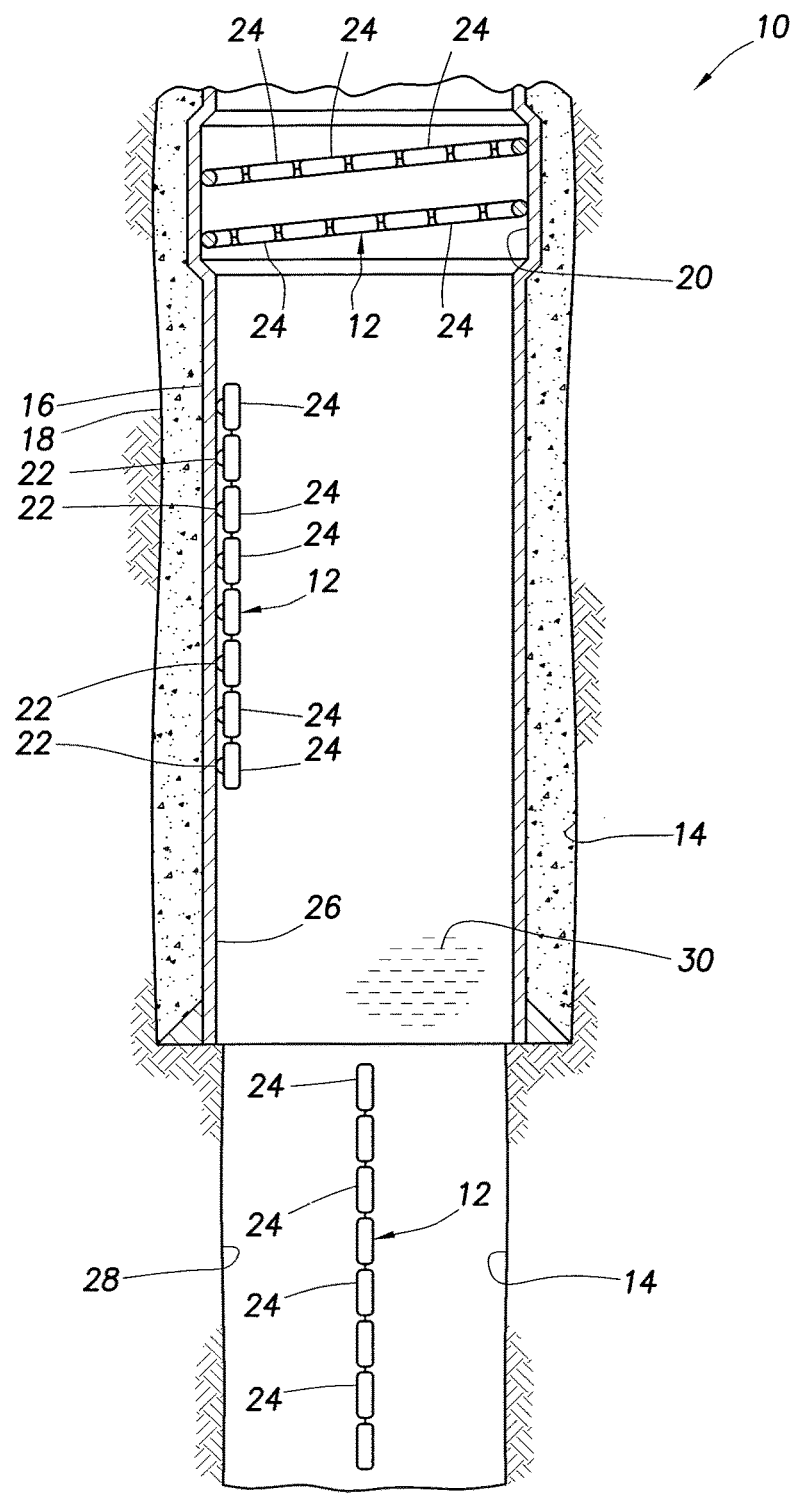
FIG. 1 is a representative partially cross-sectional view of an example of a well monitoring system and associated method which can embody principles of this disclosure.

Representatively illustrated in FIG. 1 is an example of a monitoring system 10 for use with a well, and an associated method, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, multiple monitoring apparatuses 12 are installed in a wellbore 14. It is not necessary, however, for there to be multiple monitoring apparatuses 12 in the wellbore 14, since the principles of this disclosure could be practiced with only a single apparatus in the wellbore.

The wellbore 14 as depicted in FIG. 1 has an upper section lined with casing 16 and cement 18, and a lower section that is uncased or open hole. In other examples, the entire wellbore 14 could be cased. The apparatuses 12 could be positioned in any cased and/or uncased sections of the wellbore 14, in keeping with the principles of this disclosure.

As used herein, the term "casing" indicates a generally tubular protective wellbore lining. Casing may be made up of tubulars of the type known to those skilled in the art as casing, liner or tubing. Casing may be segmented or continuous. Casing may be pre-formed or formed in situ. Thus, the scope of this disclosure is not limited to use of any particular type of casing.

As used herein, the term "cement" indicates an initially flowable substance that hardens to form a seal in a well. Cement is not necessarily cementitious, since other types of cement can include epoxies or other hardenable polymers, composites, etc. Cement may harden due to hydration of the cement, passage of time, application of heat, contact with a hardening agent, or any other stimulus. Cement may be used to secure a casing in a wellbore and seal off an annulus formed between the casing and the wellbore. Cement may be used to seal off an annulus formed between two tubular strings. Cement may be used to seal off a passage extending through a tubular string. Thus, the scope of this disclosure is not limited to use of any particular type of cement, or to any particular use for cement.

In the FIG. 1 example, the monitoring apparatuses 12 are depicted in different configurations. An upper one of the apparatuses 12 is helically arranged in a radially enlarged recess 20 formed in the casing 16. This can be considered a "parked" apparatus 12, in that the apparatus can remain motionless in the recess indefinitely.

Positioned in the recess 20, the apparatus 12 does not obstruct operations (such as, drilling, stimulation, completion, production or workover operations, etc.) that may be performed in the wellbore 14. Although the recess 20 is depicted in FIG. 1 as being formed in the casing 16, in other examples recesses may be formed by, for example, under-reaming a cased or uncased section of the wellbore 14. The recess 20 or a shoulder could be in or above a liner or tubing hanger (see, for example, FIG. 2). Thus, the scope of this disclosure is not limited to use of the recess 20 as depicted in FIG. 1.

The apparatus 12 can leave and return to the recess 20 at any time. Examples of ways the apparatus 12 can displace through the wellbore 14 are indicated by the middle and lower apparatuses 12 depicted in FIG. 1. However, it is not necessary for the apparatus 12 to be positioned in, or to displace to or away from, a recess in keeping with the scope of this disclosure.

The middle apparatus 12 depicted in FIG. 1 can displace by means of motor-driven wheels 22 extending laterally outward from segments 24 of the apparatus. The wheels 22 engage an inner surface 26 of the casing 16. If the casing 16 is made of a ferrous material, the wheels 22 could be biased into contact with the surface 26 using magnetic attraction.

If the middle apparatus 12 of FIG. 1 were instead positioned in an uncased section of the wellbore 14, the apparatus could assume a helical configuration, in order to bias the wheels 22 into contact with an inner surface 28 of the wellbore. Of course, if the wellbore 14 is inclined or horizontal, gravity can bias the wheels 22 into contact with the surfaces 26, 28.

The lower apparatus 12 depicted in FIG. 1 displaces through the wellbore 14 due to a difference in density between the apparatus and fluid 30 in the wellbore. A buoyancy of the apparatus 12 is increased to cause the apparatus to rise through the fluid in the wellbore 14, and the buoyancy of the apparatus is decreased to cause the apparatus to descend through the fluid in the wellbore.

As described more fully below, "parking" of one or more apparatuses 12 in the wellbore 14 (whether or not in the recess 20) and/or displacement of one or more apparatuses through the wellbore can provide for effective telemetry of sensor measurements, other data, commands, or other types of communication of information. In addition, the apparatuses 12 can displace or remain at any location in the wellbore 14, either autonomously, automatically and/or in response to commands transmitted from a remote location (such as, a surface control station, a subsea communication station, a bottom hole assembly, a water or land based rig, etc.).

In the FIG. 1 example, each of the apparatuses 12 comprises multiple segments 24. The segments 24 are articulable relative to one another, so that the apparatus 12 can take on various configurations (such as, the linear and helical arrangements depicted in FIG. 1). However, the scope of this disclosure is not limited to use of the articulated segments 24 in the apparatus 12.

Figure 2:
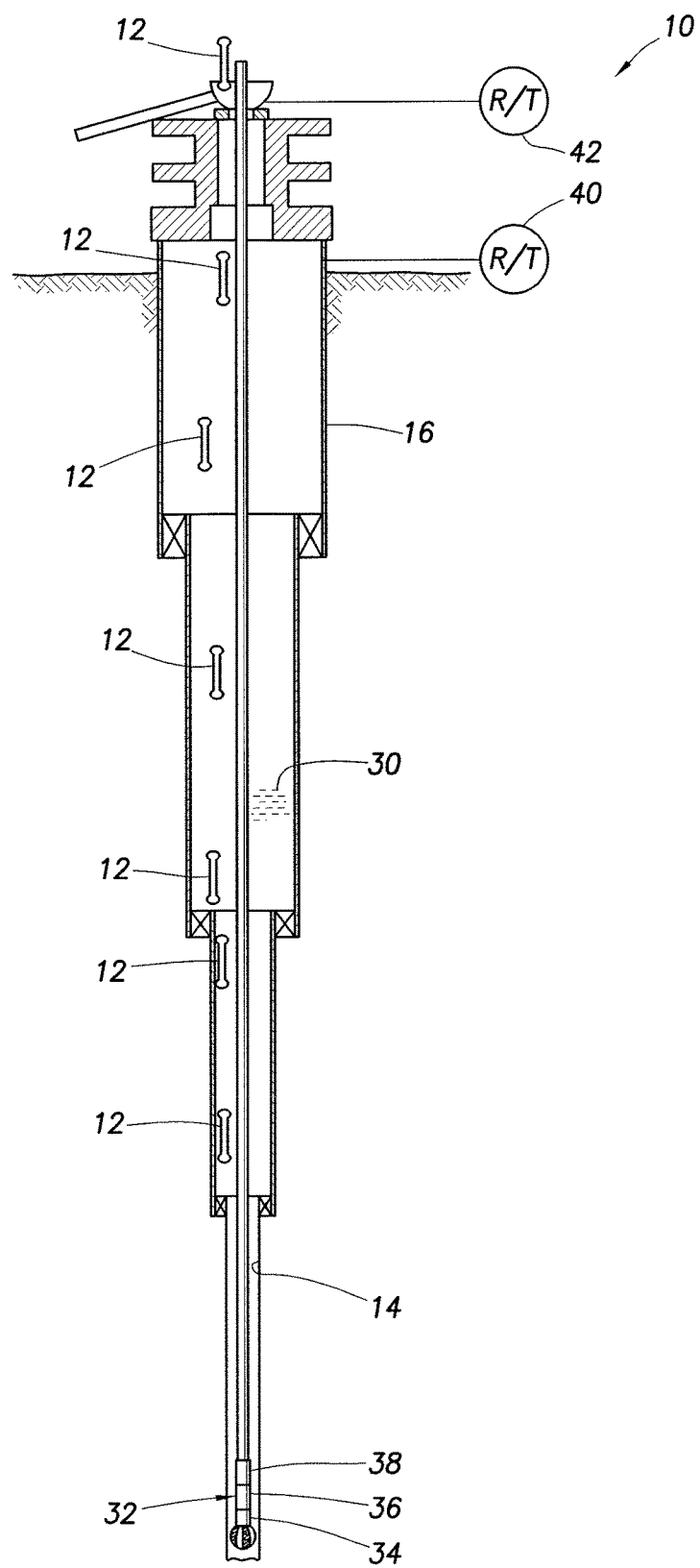
FIG. 2 is a representative partially cross-sectional view of another example of the system and method.

Referring additionally now to FIG. 2, another example of the system 10 and method is representatively illustrated. In this example, multiple monitoring apparatuses 12 are installed in the wellbore 14, in order to provide for communication between a bottom hole assembly 32 and a surface location.

The bottom hole assembly 32 in the FIG. 2 example is a drilling assembly comprising a drill bit 34, one or more sensors 36 (such as, pressure, temperature, torque, weight on bit, flow, resistivity, density, fluid type and/or other types of sensors) and a communication device 38. In other examples, the bottom hole assembly 32 could be another type of assembly (such as, a stimulation, completion or production assembly, etc.), and the assembly could include other or different elements (such as, a drilling motor, a reamer, a stabilizer, a steering device, etc.). Thus, the scope of this disclosure is not limited to use of any particular bottom hole assembly configuration.

The communication device 38 of the bottom hole assembly 32 may be any type of communication device capable of communicating with one of the apparatuses 12. For example, pressure pulse, acoustic, electromagnetic or any other type of telemetry may be used. The communication device 38 may only transmit information, or may both transmit and receive information. The scope of this disclosure is not limited to use of any particular type of communication device 38 in the bottom hole assembly 32.

A well environment can be noisy, and interference with communications can be caused by flowing fluids and particles, presence of ferrous materials, pipes rotating or otherwise displacing in casing, etc. Thus, communicating over large distances can be difficult, impractical or impossible.

In the FIG. 2 example, by positioning one of the apparatuses 12 in relatively close proximity to the bottom hole assembly 32, the apparatus can more effectively communicate with the communication device 38. In addition, multiple apparatuses 12 can be distributed along the wellbore 14, so that each apparatus can effectively communicate with a communication device above and below that apparatus.

However, in some circumstances (such as, drilling operations), a position of the bottom hole assembly 32 can change over time, and so positions of the apparatuses 12 can also change over time. In some examples, the apparatuses 12 can be provided with "intelligence" allowing them to select appropriate spacings between them, so that effective communication is maintained as well conditions change.

For example, a first apparatus 12 introduced into the wellbore 14 may descend until it can effectively communicate with the communication device 38 of the bottom hole assembly 32. The apparatus 12 can then maintain a position that is at a distance no greater than that at which effective communication is maintained.

A second apparatus 12 introduced into the wellbore 14 can then descend until it can effectively communicate with the first apparatus 12. The second apparatus 12 can then maintain a position that is at a distance no greater that that at which effective communication with the first apparatus can be maintained.

This process can be repeated until a sufficient number of apparatuses 12 have been introduced into the wellbore 14, so that the last apparatus can effectively communicate with one or more communication devices 40, 42 at a remote location (such as, the earth's surface, a subsea location, a water or land based rig, etc.). Additional apparatuses 12 can be introduced into the wellbore 14 as needed to maintain effective communication between the communication device 38 of the bottom hole assembly 32 and the communication device(s) 40, 42 at the remote location.

Thus, the apparatuses 12 function to relay information between the communication device 38 and the communication device(s) 40, 42. In addition, the intelligence of the apparatuses 12 can be used to vary spacings between the apparatuses as needed to maintain effective communication.

For example, the spacings are not necessarily equal if more interference or noise exists in one section of the wellbore 14 as compared to other sections of the wellbore. As another example, the spacings can change if levels of interference or noise change over time, or if the location of the bottom hole assembly 32 changes over time.

In the FIG. 2 example, the apparatuses 12 displace through the wellbore 14 in response to buoyancy changes. The apparatuses 12 do not necessarily include the articulated segments 24 depicted in the FIG. 1 example. However, the FIG. 2 apparatuses 12 could include the articulated segments 24, and could displace through the wellbore 14 by other means (such as, the motorized wheels 22 depicted in FIG. 1), in keeping with the principles of this disclosure.

The intelligence of the apparatuses 12 can be used to control their buoyancies, and to adapt to different densities of fluid 30 in the wellbore 14. Thus, the buoyancy of each apparatus 12 can be adjusted autonomously and automatically as needed to either maintain a selected position in the wellbore 14, or to rise or descend in the wellbore.

Referring additionally now to FIG. 3, an example of the monitoring apparatus 12 is representatively illustrated, apart from the system 10 and method of FIGS. 1 & 2. The apparatus 12 of FIG. 3 may be used in the system 10 and method of FIGS. 1 & 2, or it may be used in other systems and methods, in keeping with the principles of this disclosure.

In the FIG. 3 example, the apparatus 12 comprises the multiple articulated segments 24. The segments 24 are arranged in a linear configuration. In this linear configuration, the apparatus 12 can most rapidly displace along the wellbore 14 (see FIGS. 1 & 2), and can traverse obstructions, narrow passages, etc.

Note that it is not necessary for all of the segments 24 of the apparatus 12 to be identical to each other. In the FIG. 3 example, an upper segment 24*a* and a lower segment 24*b* are different from segments 24 between the upper and lower segments.

For example, the upper and lower segments 24*a,b* could include communication devices (not shown, see FIG. 6), whereas the middle segments 24 may not include communication devices. As another example, the upper segment 24*a* could include a buoyancy device (not shown, see FIG. 6) for changing a buoyancy of the apparatus 12, whereas the other segments 24, 24*b* may not include buoyancy control devices. Thus, the scope of this disclosure is not limited to use of any particular configuration or combination of configurations of apparatus segments 24, 24*a,b*.

Referring additionally now to FIGS. 4 & 5, the apparatus 12 is representatively illustrated in a helical configuration. The apparatus 12 is positioned in the casing 16, and the helical configuration enables the apparatus to effectively adapt to the casing's inner diameter and contact the inner surface 26 of the casing.

In the helical configuration, the apparatus 12 can maintain a selected position in the casing 16, for example, to enable long term "parking," to monitor well parameters at the position over time, to recharge batteries (not shown, see FIG. 6), or for other purposes. The scope of this disclosure is not limited to any particular purpose for maintaining the apparatus 12 at a certain position for an extended period of time in the helical configuration.

In the helical configuration, the apparatus 12 can also displace helically along the inner surface 26 of the casing 16 (or along the surface 28 of the wellbore 14, see FIG. 1), for example, using the motorized wheels 22 (see FIG. 1) and/or buoyancy changes. By displacing deliberately along the inner surface 26 of the casing 16, or along the surface 28 of the wellbore 14, sensors of the apparatus 12 (not shown, see FIG. 6) can sense certain well parameters along the wellbore (such as, casing integrity, cement to casing bond, flow behind casing, resistivity, density, pressure, temperature, fluid density, viscosity etc.).

With helical displacement of the apparatus 12, it will be appreciated that a higher azimuthal resolution of sensor measurements can be obtained, and measurements can be obtained more completely about the casing 16 and wellbore 14, as compared to linear displacement of the apparatus along the wellbore. However, sensor measurements can be obtained with the apparatus 12 in the linear configuration (see FIG. 3), in keeping with the principles of this disclosure.

In one example of the method, the apparatus 12 can initially descend in a linear configuration and then, upon striking an obstruction (such as, a bridge plug or a bottom of the wellbore 14) the apparatus can change to the helical configuration. A buoyancy of the apparatus 12 can then increase, so that the apparatus (with or without assistance of the motorized wheels 22) will ascend helically along the wellbore 14 while recording/transmitting sensor measurements.

In another example, the apparatus 12 can have a built-in casing collar locating capability to enable counting casing collars as the apparatus descends in a linear configuration. When the apparatus 12 counts a pre-programmed number of casing collars (and the apparatus is, thus, at a desired depth), the apparatus can change to the helical configuration.

In another example of the method, the apparatus 12 (or multiple apparatuses) can be initially wrapped about a tubular string (such as, a drill string or a production string) when it is deployed in the well. Then, the apparatus 12 can "unwind" from the tubular string and displace to an appropriate position in the well.

Figure 6:
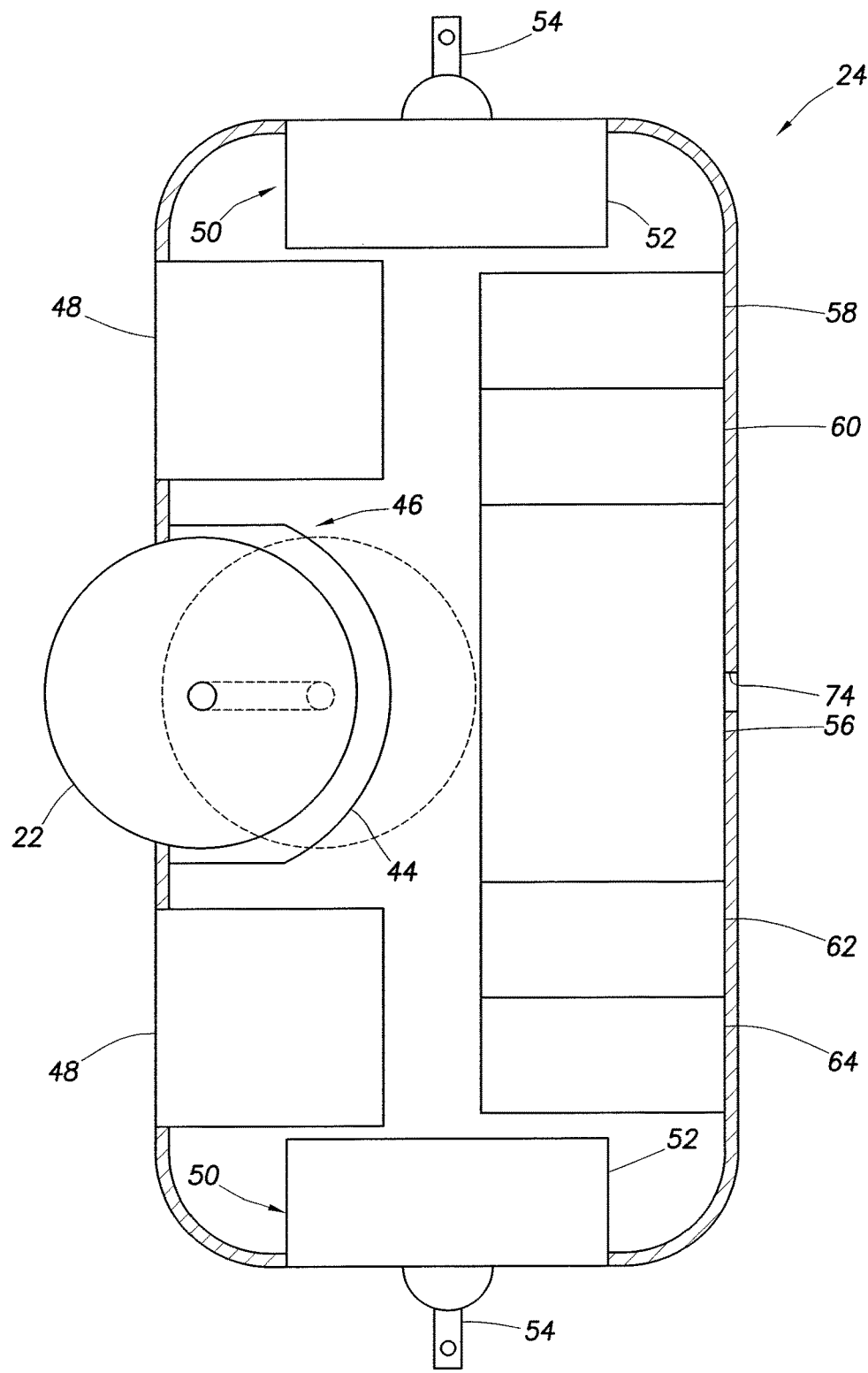
FIG. 6 is an enlarged scale representative partially cross-sectional view of an example of a segment of the monitoring apparatus.

Referring additionally now to FIG. 6, an enlarged scale partially cross-sectional view of one example of a segment 24 of the apparatus 12 is representatively illustrated. The segment 24 depicted in FIG. 6 may be used for the upper segment 24*a*, the lower segment 24*b* or any other segment 24 of the apparatus 12. However, it should be clearly understood that the segment 24 depicted in FIG. 6 is merely one example of a particular segment configuration, and a wide variety of other examples may be used, in keeping with the principles of this disclosure.

In the FIG. 6 example, the segment 24 includes the wheel 22, which is rotated by a motor 44. The motor 44 may also include an actuator (not shown) for inwardly retracting the wheel 22. For example, if the apparatus 12 is displacing through the wellbore 14 (see FIGS. 1 & 2) in the linear configuration due to a buoyancy change, or if the apparatus is parked or otherwise maintaining its position in the wellbore, then the wheel 22 may not be needed and can be retracted.

The wheel 22 and motor 44 can be considered an engagement device 46 for engaging a well surface (such as, the inner surface 26 of the casing 16, the surface 28 of the wellbore 14, etc.). In some examples, the wheel 22 could be magnetized or made of a magnetic material, so that the wheel is biased into contact with the casing surface 26 or another well surface due to magnetic attraction.

Alternatively, or in addition, one or more magnetic engagement devices 48 (such as, permanent magnets and/or electromagnets, etc.) may be included in the segment 24 to bias the segment toward a well surface due to magnetic attraction. If the wheel 22 is extended, the magnetic attraction can be used to bias the wheel into contact with the well surface. If the wheel 22 is retracted, the magnetic attraction can be used to secure the apparatus 12 in position (that is, to prevent displacement of the apparatus along the wellbore 14).

If the wheel 22 is in contact with a well surface 26, 28 and the apparatus 12 displaces by means of fluid drag due to flowing fluid (e.g., in a production, drilling or stimulation operation), or by means of a buoyancy change, etc., such displacement can cause rotation of the wheel. Rotation of the wheel 22 can be used to generate electricity, for example, if the motor 44 is also a generator.

Although only one wheel 22 and motor 44 are depicted in FIG. 6, it will be appreciated that any number of wheels and/or motors may be provided. In some examples, a sufficient number of wheels 22 and motors 44 may be provided in the segment 24, so that at least one of the wheels contacts a well surface 26, 28, at any rotational orientation of the segment relative to the surface.

The FIG. 6 segment 24 example also includes an articulation device 50 at each opposite end of the segment. The articulation devices 50 are used to control relative orientation between the segment 24 and adjacent segments connected at the opposite ends of the segment. Of course, if the segment 24 is at either opposite end of the apparatus 12, then there is only one adjacent segment, and so only one articulation device 50 may be used.

The articulation device 50 in the FIG. 6 segment 24 example includes an actuator 52 and a connecting arm 54. The actuator 52 is used to displace the arm 54 and thereby control the orientation of the segment 24 relative to an adjacent segment connected to the arm.

The actuator 52 can displace the arm 54 in three dimensions, in two dimensions, in one dimension, rotationally, longitudinally, laterally or in any other manner, in keeping with the principles of this disclosure. In some examples, the actuator 52 may comprise piezoelectric, magnetostrictive, electrostrictive, or other types of electromagnetically active materials, although conventional servos, solenoids or other types of motion-producing mechanisms may be used, if desired.

Figure 7:
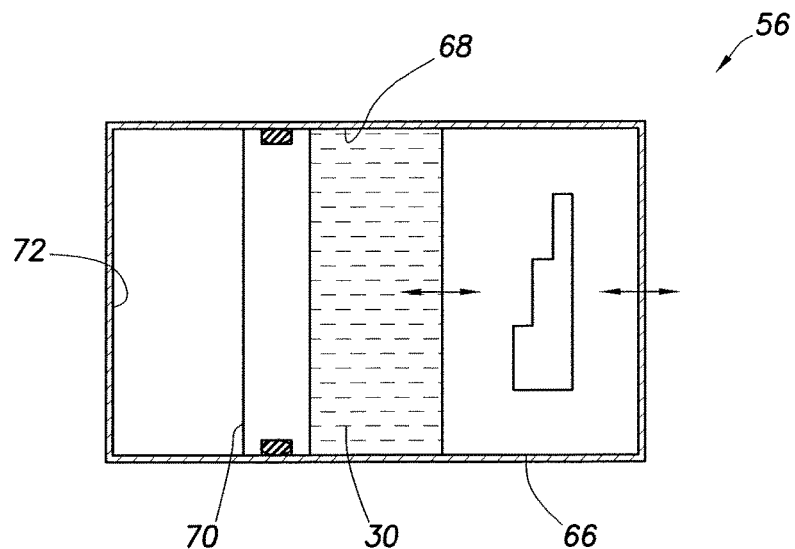
FIGS. 7 & 8 are representative schematic views of examples of a buoyancy control device that may be used in the monitoring apparatus.
Figure 8:
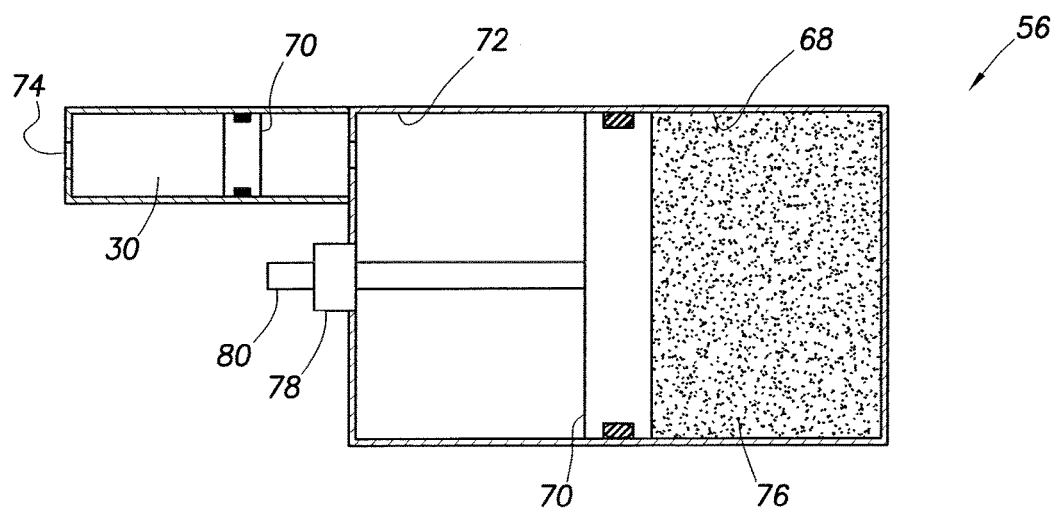

The FIG. 6 segment 24 example also includes a buoyancy control device 56, a power source 58, a computing device 60, one or more sensors 62 and a communication device 64. The buoyancy control device 56 is used to maintain or change a buoyancy of the segment 24 and thereby maintain or change a buoyancy of the overall apparatus 12 as needed to maintain or change a position of the apparatus in the wellbore 14 (see FIGS. 1 & 2). Examples of the buoyancy control device 56 are depicted in FIGS. 7 & 8, and are described more fully below.

The buoyancy control can be coordinated with well operations. For example, in a drilling operation, the apparatus 12 may be parked during actual drilling. When drilling fluid flow is stopped (such as, during a drill pipe connection make-up), the apparatus 12 can descend to a position closer to the bottom hole assembly 32 (see FIG. 2), if needed for effective communication, or multiple apparatuses can adjust their spacing for optimal data transmission. The apparatuses 12 would again park upon resumption of drilling fluid flow.

The power source 58 is used to provide electrical power to the various other electrical devices of the segment 24. The power source 58 may include batteries and/or an electrical generator. If an electrical generator is included, the generator may generate electrical power in response to fluid flow, heat, or other stimulus in the wellbore 14.

The computing device 60 is used to control operation of the other devices of the segment 24, to store and process sensor measurements, and to otherwise embody the "intelligence" of the segment. In the FIG. 6 example, the computing device 60 controls operation of the engagement devices 46, 48, the articulation devices 50, the buoyancy control device 56 and the communication device 64, stores and processes measurements made by the sensors 62, and stores and executes instructions (e.g., in the form of software, firmware, etc.) for the various functions performed by the computing device.

The computing device 60 can include at least one processor and at least one memory (e.g., volatile, non-volatile, erasable, programmable, etc., memory) for executing and storing instructions, data, etc. The computing device 60 can also include, or serve as, a modem, for example, to modulate data for transmission.

The sensors 62 are used to measure well parameters of interest. The sensors 62 can include pressure, temperature, resistivity, density, fluid type and composition, fluid density, viscosity, acoustic, electromagnetic, optical or any other type of sensors. Pressure measurements may be used to inform and/or modify buoyancy control. Accelerometers, gyroscopes, etc. may be used to determine position and navigate in the well. The scope of this disclosure is not limited to use of any particular type or combination of sensors.

The communication device 64 is used to transmit and receive signals comprising sensor measurements, other data, handshake protocols, commands, other information, etc. The signals may comprise pressure pulse, acoustic, electromagnetic, optical or any other type or combination of telemetry signal. The communication device 64 may be capable of switching from one type of telemetry signal reception or transmission to another type of telemetry signal reception or transmission. The scope of this disclosure is not limited to use of any particular type of communication device.

Referring additionally now to FIG. 7, an example of the buoyancy control device 56 is representatively and schematically illustrated, apart from the remainder of the segment 24 of FIG. 6. However, the buoyancy control device 56 of FIG. 7 may be used with other segments, in keeping with the principles of this disclosure.

In the FIG. 7 example, the buoyancy control device 56 includes a positive displacement pump 66 that transfers well fluid 30 between an exterior of the segment 24 and a chamber 68 (for example, via a port 74 in the segment, see FIG. 6). A floating piston 70 sealingly separates the chamber 68 from a gas-filled chamber 72.

As the pump 66 fills the chamber 68 with the fluid 30, the chamber 72 decreases in volume, and the buoyancy of the segment 24 decreases. Conversely, as the pump 66 discharges fluid 30 from the chamber 68 to the exterior of the segment 24, the chamber 72 increases in volume, and the buoyancy of the segment 24 increases.

It will be appreciated that the FIG. 7 depiction of the buoyancy control device 56 is simplified and a wide variety of variations are possible. For example, the piston 70 could be replaced with a membrane, bladder or other type of displaceable fluid barrier. Instead of using the pump 66, the piston 70 could be displaced by a motor (not shown) to control the relative volumes of the chambers 68, 72. Thus, the scope of this disclosure is not limited at all to any of the details of the buoyancy control device 56 depicted in FIG. 7.

Referring additionally now to FIG. 8, another example of the buoyancy control device 56 is representatively illustrated. In this example, the volume of the chamber 72 is controlled by controlling a volume of a substance 76 in the chamber 68. The volume of the substance 76 may change in response to any stimulus (such as, heat, electrical or magnetic input, etc.). A latching device 78 engaged with a rod 80 attached to the piston 70 may be used to maintain a desired position of the piston.

Figure 9:
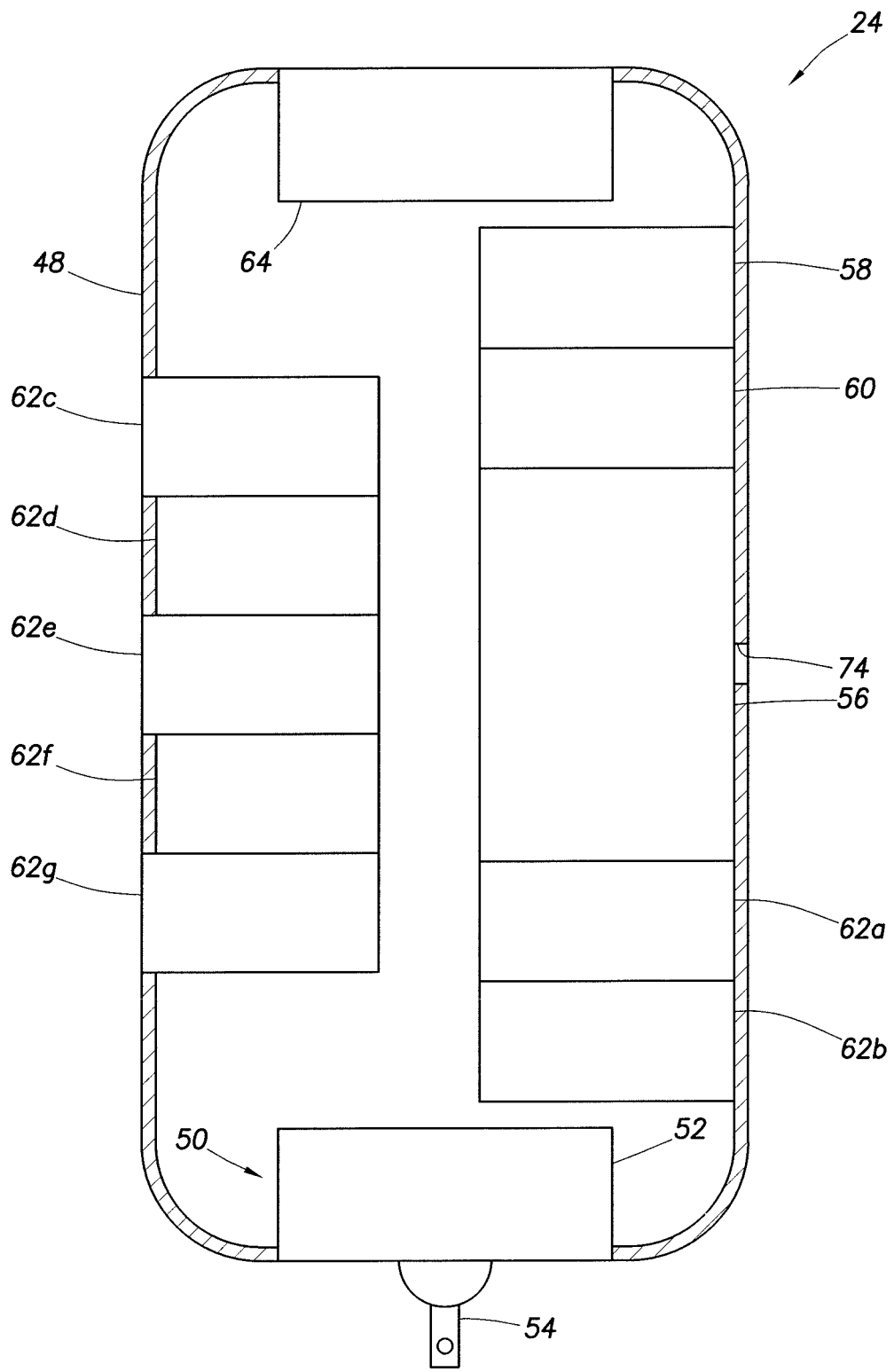
FIG. 9 is a representative partially cross-sectional view of another example of a segment of the monitoring apparatus.

Referring additionally now to FIG. 9, another example of the segment 24 is representatively illustrated. In this example, the segment 24 is configured for use at an end of the apparatus 12 (e.g., as the segment 24a or, inverted, as the segment 24b depicted in FIG. 3). Thus, only one articulation device 50 is provided in the segment 24 of FIG. 9, for articulable connection to an adjacent segment.

Another difference in the FIG. 9 example of the segment 24 is that the communication device 64 is positioned at an end of the segment (opposite from the articulation device 50). Thus, it will be appreciated that any configuration, combination or arrangement of the segment 24 components may be used, in keeping with the scope of this disclosure.

In the FIG. 9 example, the segment 24 includes a combination of sensors 62a-g for well monitoring. These sensors include an accelerometer 62a, a gyroscope 62b, an optical sensor 62c, an inductive sensor 62d, a pressure and temperature sensor 62e, a magnetic field sensor 62f, and a resistivity sensor 62g. Of course, other types or combinations of sensors may be used, in keeping with the scope of this disclosure.

The optical sensor 62c could be any one or combination of an infrared sensor, a molecular factor computing sensor (e.g., as described in International application no. PCT/

US14/46994, filed 17 Jul. 2014), or an opto-analytical device (e.g., including an integrated computational element (ICE) as described in International application no. PCT/US14/43997, filed 25 Jun. 2014). The optical sensor 62c could be an optical sensor configured to operate in one or more wavelength ranges, such as, ultraviolet, visible or microwave portions of the electromagnetic spectrum. Thus, the scope of this disclosure is not limited to any particular type, number or combination of optical sensor(s).

The inductive sensor 62d may be used to measure casing thickness, detect casing collars, detect areas of corrosion, etc. The optical and inductive sensors 62c,d may be used for communication purposes. The optical sensor 62c may be used to determine fluid types and compositions. The scope of this disclosure is not limited to any particular purpose or function for any of the sensors 62a-g.

Figure 10:
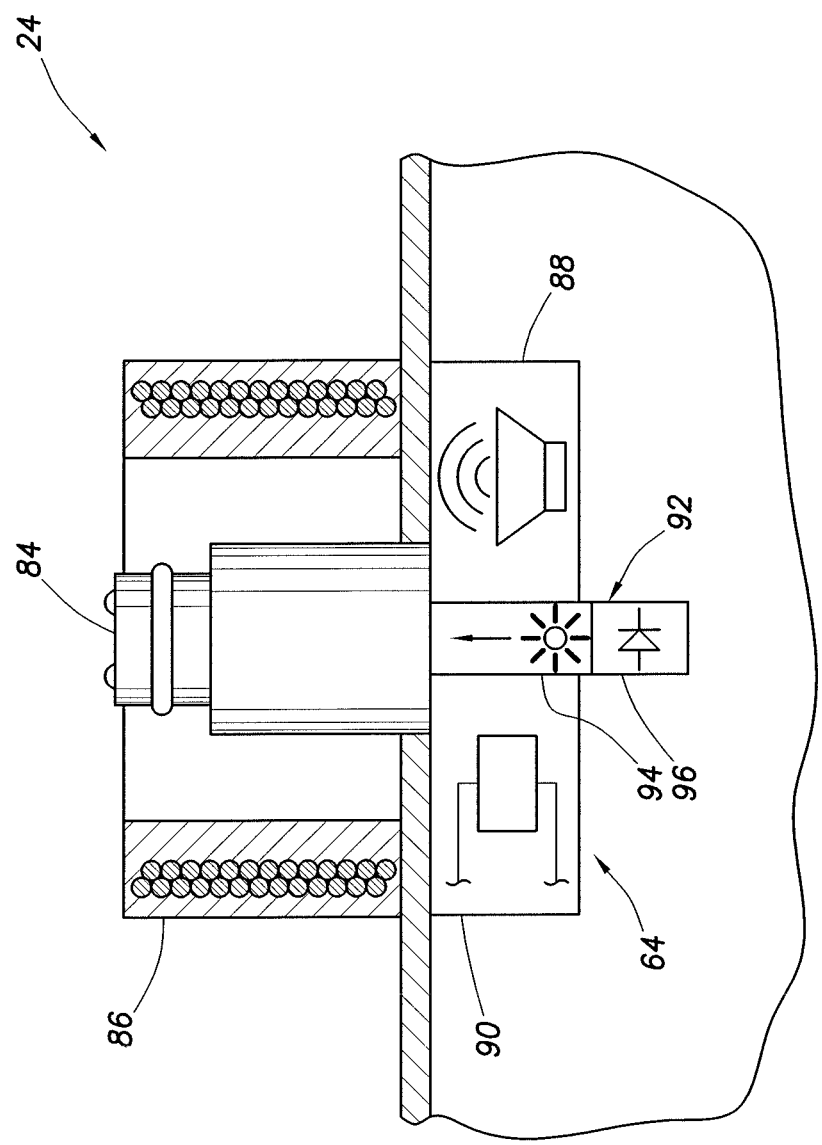
FIG. 10 is a representative partially cross-sectional view of an example of a communication device that may be used in the monitoring apparatus.

Referring additionally now to FIG. 10, an enlarged scale view of the communication device 64 is representatively illustrated. The communication device 64 may be used in the segment 24 example of FIG. 9, or it may be used in other segments.

In the FIG. 10 example, the communication device 64 includes an electrical and/or optical wet connector 84, an inductive coupler 86, an acoustic transceiver 88, a vibratory transceiver 90, and an optical transceiver 92. This example is intended to demonstrate that a wide variety of different types of communication and telemetry components may be used in the communication device 64. However, in practice, only one or a small number of communication and/or telemetry components may be used in the device 64. In any event, the scope of this disclosure is not limited to any particular number, type, combination or arrangement of components in the communication device 64.

The wet connector 84 is configured to make a direct electrical and/or optical connection with another wet connector in the well. In addition, the connector 84 could be used to download data from the apparatus 12 or upload instructions to the apparatus, recharge batteries of the apparatus, etc., at the surface.

The acoustic transceiver 88 is configured to transmit and receive acoustic signals. In some examples, a separate acoustic emitter may be used for transmitting acoustic signals, and a separate acoustic receiver (e.g., a microphone) may be used for receiving acoustic signals.

The vibratory transceiver 90 is configured to transmit and receive vibratory signals (whether or not in an acoustic range). For example, a piezoelectric element could be used to both emit and detect vibratory signals. In some examples, separate vibratory receivers and transmitters could be used.

The optical transceiver 92 in the FIG. 10 example includes an optical source 94 (such as, a broadband light source, a laser or a light emitting diode) and an optical detector 96 (such as, a photo-detector or a photodiode). The optical transceiver 92 may operate in conjunction with the wet connector 84 to establish optical communication with another device.

Although the transceivers 88, 90, 92 are described above as both receiving and transmitting communication signals, it is not necessary for signals to be both received and transmitted. For example, in some embodiments, information may be communicated only from the apparatus 12 to a communication device/receiver. In those examples, electrical power could still be received by the apparatus 24 (such as, via the wet connect 84 or inductive coupler 86).

Figure 11:
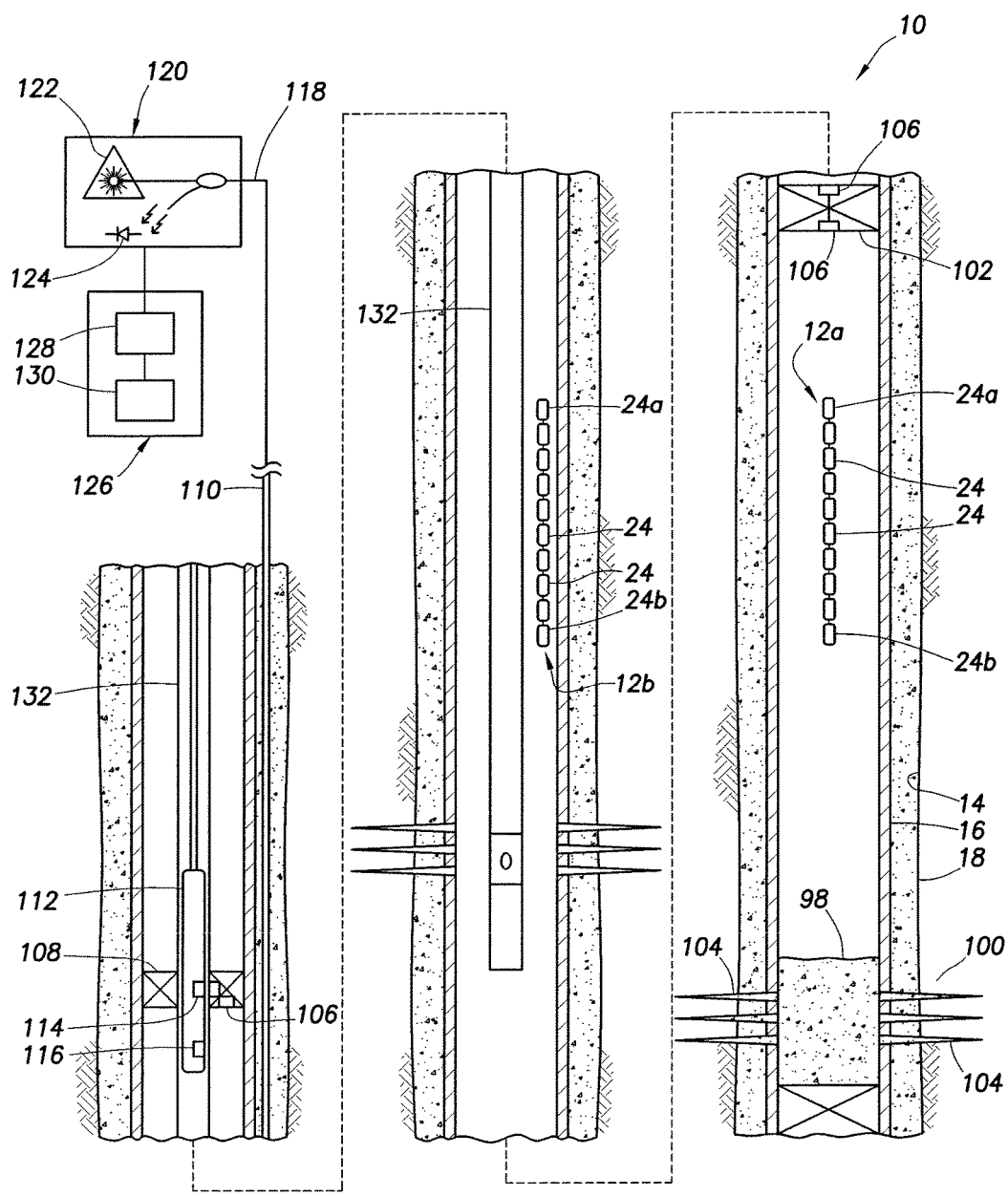
FIG. 11 is a representative partially cross-sectional view of another example of the system and method.

Referring additionally now to FIG. 11, another example of the well monitoring system 10 and method is representatively illustrated. In this example, multiple monitoring apparatuses 12a,b are used to measure various parameters in the well, and to transmit parameter measurements and/or other information to a remote location. However, in other examples, only a single apparatus 12 may be used for these purposes.

The apparatuses 12a,b depicted in FIG. 11 utilize a segment similar to that depicted in FIG. 9 for their upper and lower segments 24a,b, and utilize a segment similar to that depicted in FIG. 6 for their intermediate segments 24. However, note that use of the FIGS. 6 & 9 segments 24 would result in duplication of various components (such as, sensors 62, 62a-g, computing devices 60, power sources 58, etc.), so duplicative components may be deleted, as desired.

A lower section of the well has been permanently abandoned in the FIG. 11 example. The casing 16 has been filled with cement 98 to a level above a set of perforations 104, in order to seal off fluid flow between an earth formation 100 and an interior of the casing. In addition, a bridge plug 102 has been set in the casing 16 above the cement 98.

One of the apparatuses 12a is disposed in the casing 16 between the cement 98 and the bridge plug 102. The apparatus 12a can displace back and forth between the cement 98 and the bridge plug 102 at any predetermined periodic interval, or the apparatus can remain parked (for example, at the bridge plug), until an appropriate stimulus causes the apparatus to "wake" and perform a monitoring procedure.

The apparatus 12a may displace in the linear configuration as depicted in FIG. 11, in the helical configuration as depicted in FIG. 4, or in any other suitable configuration. Such displacement may be by means of buoyancy change, motorized wheels 22 (see FIG. 6), and/or by any other suitable means.

The sensors 62, 62a-g of the apparatus 12a can detect/measure various parameters while the apparatus displaces through the casing 16 and/or while the apparatus is parked. In some examples, the apparatus 12a can detect whether the casing 16 remains viable (e.g., whether a thickness of the casing remains acceptable, whether a casing to cement bond remain acceptable, whether corrosion has penetrated the casing, etc.), whether there is fluid communication between the casing and the formation 100, what fluid type(s) and composition(s) is/are present in the space between the cement 98 and the bridge plug 102, etc. The scope of this disclosure is not limited to any particular parameter(s) or combination of parameters sensed or measured by the sensors 62, 62a-g of the apparatus 12a.

Communication of information and/or electrical power across the bridge plug 102 between the apparatuses 12a,b can be by various means. For example, information may be transmitted acoustically between the acoustic transceivers 88 (see FIG. 10) of the apparatuses 12a,b. As another example, connectors 106 may be used to connect the wet connectors 84, inductive couplers 86 and/or optical transceivers 92 of the apparatuses 12a,b.

Thus, the connectors 106 may themselves comprise wet connectors, inductive couplers and/or optical transceivers (or at least optical waveguides). Acoustic and/or vibratory transceivers could also, or alternatively, be included in the connectors 106.

The other apparatus 12b is disposed in a section of the well between the bridge plug 102 and a packer 108. This section of the well may be temporarily abandoned, or it may be producing.

If the well section is temporarily abandoned, the apparatus 12b may be used to monitor parameters the same as or similar to those monitored by the apparatus 12a. If the well section is producing, the apparatus 12b may be used to monitor the production (e.g., flow rate, pressure, temperature, fluid type and composition, etc.), as an alternative to, or in addition to, the parameters monitored by the apparatus 12a.

As with the apparatus 12a, the apparatus 12b may displace in the linear configuration as depicted in FIG. 11, in the helical configuration as depicted in FIG. 4, or in any other suitable configuration. Such displacement may be by means of buoyancy change, motorized wheels 22 (see FIG. 6), and/or by any other suitable means.

Communication of information and/or electrical power across the packer 108 between the apparatus 12b and another apparatus (not shown) above the packer can be by various means. For example, information may be transmitted acoustically between the acoustic transceivers 88 (see FIG. 10) of the apparatuses. As another example, connectors 106 may be used to connect the wet connectors 84, inductive couplers 86 and/or optical transceivers 92 of the apparatuses.

As another alternative, an optical cable 110 or a wireline, coiled tubing or slickline-conveyed tool 112 may be used to communicate with the apparatus 12b. For example, the tool 112 could include an inductive coupler 114 and/or another transceiver 116 for acoustic, vibratory or electromagnetic communication directly with the apparatus 12b, or communication via the connector(s) 106 of the packer 108.

In some examples, the tool 112 may be conveyed through a tubular string 132 positioned in the casing 16. The tubular string 132 can extend to and/or through the packer 108 (e.g., the packer being an element of the tubular string). The apparatus 12b can be conveyed into the well wrapped helically about the tubular string 132 (and be released after the tubular string is installed in the well, such as, after the packer 108 is set and pressure tested), and may in some examples displace in the well between the tubular string and the casing 16.

The cable 110 includes therein at least one optical waveguide 118 (such as, an optical fiber or an optical ribbon), and may include other lines (such as, electrical and/or hydraulic lines), strength members, etc. The cable 110 may, in some examples, be in the form of the optical waveguide 118 enclosed by armor or another protective covering (such as, a metal tube).

Whether or not the optical waveguide 118 is part of a cable, the optical waveguide could be internal or external to, or positioned in a wall of, any tubular string (such as, the casing 16). The scope of this disclosure is not limited to any particular form, configuration or position of the optical waveguide 118 in a well.

In the FIG. 11 example, the optical waveguide 118 is optically connected to an optical interrogator 120. The optical interrogator 120 is depicted schematically in FIG. 11 as including an optical source 122 (such as, a laser or a light emitting diode) and an optical detector 124 (such as, an opto-electric converter or photodiode).

The optical source 122 launches light (electromagnetic energy) into the waveguide 118, and light returned to the interrogator 120 is detected by the detector 124. Note that it is not necessary for the light to be launched into a same end of the optical waveguide 118 as an end via which light is returned to the interrogator 120.

Other or different equipment (such as, an interferometer or an optical time domain or frequency domain reflectometer) may be included in the interrogator 120 in some examples. The scope of this disclosure is not limited to use of any particular type or construction of optical interrogator.

A computer 126 is used to control operation of the interrogator 120, and to record optical measurements made by the interrogator. In this example, the computer 126 includes at least a processor 128 and memory 130. The processor 128 operates the optical source 122, receives measurement data from the detector 124 and manipulates that data. The memory 130 stores instructions for operation of the processor 128, and stores processed measurement data. The processor 128 and memory 130 can perform additional or different functions in keeping with the scope of this disclosure.

In other examples, different types of computers may be used, the computer 126 could include other equipment (such as, input and output devices, etc.). The computer 126 could be integrated with the interrogator 120 into a single instrument. Thus, the scope of this disclosure is not limited to use of any particular type or construction of computer.

The optical waveguide 118, interrogator 120 and computer 126 may comprise a distributed acoustic sensing (DAS) system or distributed vibration sensing (DVS) system capable of detecting acoustic or vibration energy as distributed along the optical waveguide. For example, the interrogator 30 can be used to measure Brillouin or Rayleigh scattering in the optical waveguide 118 as an indication of acoustic or vibration energy as distributed along the waveguide.

In addition, a ratio of Stokes and anti-Stokes components of Raman scattering in the optical waveguide 118 could be monitored as an indication of temperature as distributed along the waveguide. In other examples, Brillouin scattering may be detected as an indication of temperature as distributed along the optical waveguide 118.

In further examples, fiber Bragg gratings (not shown) could be closely spaced apart along the optical waveguide 118, so that strain in the waveguide will result in changes in light reflected back to the interrogator 120. An interferometer (not shown) may be used to detect such changes in the reflected light.

The acoustic and/or vibratory transceivers 88, 90 (see FIG. 10) can communicate directly with the optical waveguide 118. As another alternative, the optical waveguide 118 could be optically connected to the connector 106 in the packer 108, so that the wet connector 84 in the communication device 64 of the segment 24a of the apparatus 12b can provide for communication between the optical transceiver 92 and the optical waveguide 118. Thus, the scope of this disclosure is not limited to any particular technique for providing communication between the apparatus 12b and the optical waveguide 118.

It may now be fully appreciated that the above disclosure provides significant advancements to the art of well monitoring. In some examples described above, the apparatus 12 can be used to displace along a wellbore 14 and monitor a variety of different well parameters, even in situations where the apparatus is disposed in an isolated section of a well.

The monitoring apparatus 12 in certain examples described above is capable of relaying information between downhole and surface communication devices 38, 40, 42, or between itself and surface communication device(s) 40, 42, does not require any tether (such as, a wireline, slickline, control line, optical line, etc.), and can operate autonomously to achieve effective communication in a well.

A monitoring apparatus 12, 12a,b for use in a well is provided to the art by the above disclosure. In one example, the monitoring apparatus 12, 12a,b can comprise multiple segments 24, the segments including at least one buoyancy control device 56, at least one communication device 64, and at least one articulation device 50 that controls a relative orientation between adjacent ones of the segments 24. The segments 24 are not necessarily identical to each other.

The segments 24 can include at least one engagement device 46, 48 that engages a well surface 26, 28. The engagement device 48 may comprise a magnetic device. The engagement device 46 may comprise a motorized wheel 22.

The segments 24 can include a sensor 62 that measures a well parameter. The segments 24 may be helically arranged, linearly arranged, or otherwise arranged.

The "at least one" articulation device 50 may comprise multiple articulation devices. Each of the segments 24 can comprise one or more of the articulation devices 50.

Also provided to the art by the above disclosure is a method of communicating in a subterranean well. In one example, the method comprises: installing at least one monitoring apparatus 12, 12a,b in the well, the monitoring apparatus comprising a first communication device 64 and a buoyancy control device 56; and the first communication device 64 communicating with a second communication device 38, 40, 42 at a remote location (such as, a remote location in the well, a surface location, a subsea location, a water or land based rig, etc.).

The method can include the monitoring apparatus 12, 12a,b displacing in the well in response to the buoyancy control device 56 changing a buoyancy of the monitoring apparatus 12, 12a,b.

The "at least one" monitoring apparatus 12, 12a,b can comprise multiple monitoring apparatuses, and method can include the monitoring apparatuses 12, 12a,b distributing themselves in the well, with spacings between the monitoring apparatuses being at most maximum spacings having effective communication between the communication devices 64 of successive ones of the monitoring apparatuses 12, 12a,b.

The second communication device 38 may be disposed in a bottom hole assembly 32, and the method can include the second communication device 38 receiving measurements from a sensor 36 of the bottom hole assembly 32 and transmitting the sensor measurements to the first communication device 64.

The second communication device 40, 42 may be disposed at a surface location, and the method can include the second communication device 40, 42 receiving sensor measurements from the first communication device 64.

The monitoring apparatus 12, 12a,b may comprise multiple segments 24, and the method can include changing relative orientations between adjacent ones of the segments 24 in the well. The changing step can comprise helically arranging the segments 24.

A well system 10 is also described above. In one example, the system 10 can comprise: at least one monitoring apparatus 12, 12a,b disposed in a wellbore 14, the monitoring apparatus comprising multiple segments 24, the segments including at least one buoyancy control device 56 and at least one communication device 64.

The segments 24 may include at least one articulation device 50 that controls a relative orientation between adjacent ones of the segments. The segments 24 may include at least one engagement device 46, 48 that engages a surface 26, 28 in the wellbore 14.

The "at least one" monitoring apparatus 12, 12a,b may comprise multiple monitoring apparatuses. The monitoring apparatuses 12, 12a,b may be distributed in the wellbore 14, with spacings between the monitoring apparatuses being at most maximum spacings having effective communication between the communication devices 64 of successive ones of the monitoring apparatuses.

The monitoring apparatus 12, 12a,b may displace in the wellbore 14 in response to a change in buoyancy of the monitoring apparatus.

In another example, a monitoring apparatus 12, 12a,b for use in a well can comprise multiple segments 24, 24a,b, the segments comprising at least one buoyancy control device 56, at least one communication device 64, and at least one well parameter sensor 62, 62a-g.

The sensor may be selected from the group consisting of an opto-analytical device 62c, an inductive sensor 62d and a magnetic field sensor 62f. The sensor may be selected from the group consisting of a pressure and/or temperature sensor 62e, an accelerometer 62a, a resistivity sensor 62g and a gyroscope 62b.

The communication device 64 may be selected from the group consisting of an inductive coupler 86, an acoustic transceiver 88, a vibratory transceiver 90, an optical transceiver 92 and a wet connector 84.

The monitoring apparatus 12, 12a,b can include at least one articulation device 50 that controls a relative orientation between adjacent ones of the segments 24, 24a,b. The "at least one" articulation device 50 may comprise multiple articulation devices, and each of the segments 24, 24a,b may comprise at least one of the multiple articulation devices 50. The segments 24, 24a,b can be helically arranged.

A method of communicating in a subterranean well is also described above. In one example, the method comprises: installing at least one monitoring apparatus 12, 12a,b in the well, the monitoring apparatus comprising a first communication device 64, a well parameter sensor 62, 62a-g and a buoyancy control device 56. The first communication device 64 communicates with a second communication device 64, 106, 114, 116, 118.

The second communication device may be selected from the group consisting of an optical waveguide 118, an inductive coupler 114 and a transceiver 116 of a tool 112 conveyed into the well.

The "at least one" monitoring apparatus 12, 12a,b can in some examples comprise at least first and second monitoring apparatuses 12a,b. The installing step can include positioning the first and second apparatuses 12a,b in separate sections of the well. In this example, the first and second monitoring apparatuses 12a,b can comprise the respective first and second communication devices 64. The separate sections of the well may be isolated from each other.

The method can include selecting the second communication device 64, 106, 114, 116, 118 from the group consisting of an inductive coupler 86, an acoustic transceiver 88, a vibratory transceiver 90, an optical transceiver 92 and a wet connector 84.

The installing step can include positioning the monitoring apparatus 12, 12a,b in a section of the well, the well section being isolated from fluid communication with any other section of the well. The installing step can include positioning the monitoring apparatus 12, 12a,b in an abandoned section of the well.

The method can include the monitoring apparatus 12, 12a,b displacing in the well in response to the buoyancy control device 56 changing a buoyancy of the monitoring apparatus. The monitoring apparatus 12, 12a,b may comprise multiple segments 24, 24a,b, and the method can include changing relative orientations between adjacent ones of the segments 24, 24a,b in the well.

Also described above is a well monitoring system 10, comprising: at least one monitoring apparatus 12, 12a,b disposed in a wellbore 14, the monitoring apparatus comprising multiple segments 24, 24a,b, the segments including at least one buoyancy control device 56, at least one well parameter sensor 62, 62a-g, and at least one communication device 64.

The monitoring apparatus 12, 12a,b may be disposed in an abandoned section of the wellbore 14 isolated from fluid communication with any other section of the wellbore.

The communication device 64 may be selected from the group consisting of an inductive coupler 86, an acoustic transceiver 88, a vibratory transceiver 90, an optical transceiver 92 and a wet connector 84. The communication device 64 may connect to a connector 106 of a bridge plug 102 or packer 108 in the wellbore 14.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A monitoring apparatus for use in a well, the monitoring apparatus comprising:
    multiple segments, the segments comprising at least one buoyance control device, at least one communication device, and at least one well parameter sensor; and
    a wheel disposed within each of the multiple segments and wherein the wheel includes a magnetic material, wherein the wheel is configured to retract in and out of each of the multiple segments, and wherein rotation of the wheel is configured to generate energy.

2. The monitoring apparatus of claim 1, wherein the sensor is selected from the group consisting of an opto-analytical device, an inductive sensor and a magnetic field sensor.

3. The monitoring apparatus of claim 1, wherein the sensor is selected from the group consisting of a pressure sensor, a temperature sensor, a resistivity sensor, a fluid density sensor, a viscosity sensor, an accelerometer and a gyroscope.

4. The monitoring apparatus of claim 1, wherein the communication device is selected from the group consisting of an inductive coupler, an acoustic transceiver, a vibratory transceiver, an optical transceiver and a wet connector.

5. The monitoring apparatus of claim 1, further comprising at least one articulation device that controls a relative orientation between adjacent ones of the segments.

6. The monitoring apparatus of claim 1, wherein each of the segments comprises a plurality of articulation device.

7. The monitoring apparatus of claim 1, wherein the segments are helically arranged.

8. A method of communicating in a subterranean well, the method comprising:
    installing at least one monitoring apparatus in the well, the monitoring apparatus comprising a first communication device, a well parameter sensor and a buoyancy control device, wherein the at least one monitoring apparatus comprises multiple segments and each of the multiple segments include a wheel disposed within each of the multiple segments and wherein the wheel includes a magnetic material, wherein the wheel is configured to retract in and out of each of the multiple segments, and wherein rotation of the wheel is configured to generate energy; and
    the first communication device communicating with a second communication device.

9. The method of claim 8, wherein the second communication device is selected from the group consisting of an optical waveguide, an inductive coupler and a transceiver of a tool conveyed into the well.

10. The method of claim 8, the at least one monitoring apparatus comprises at least first and second monitoring apparatuses, wherein the installing further comprises positioning the first and second apparatuses in separate sections of the well, and wherein the first and second monitoring apparatuses comprise the respective first and second communication devices.

11. The method of claim 10, wherein the separate sections of the well are isolated from each other.

12. The method of claim 8, further comprising selecting the second communication device from the group consisting of an inductive coupler, an acoustic transceiver, a vibratory transceiver, an optical transceiver and a wet connector.

13. The method of claim 8, wherein the installing further comprises positioning the monitoring apparatus in a section of the well, the well section being isolated from fluid communication with any other section of the well.

14. The method of claim 8, wherein the installing further comprises positioning the monitoring apparatus in an abandoned section of the well.

15. The method of claim 8, further comprising the monitoring apparatus displacing in the well in response to the buoyancy control device changing a buoyancy of the monitoring apparatus.

16. The method of claim 8, further comprising changing relative orientations between adjacent ones of the segments in the well.

17. A well monitoring system, comprising:
at least one monitoring apparatus disposed in a wellbore, the monitoring apparatus comprising multiple segments, the segments including at least one buoyancy control device, at least one well parameter sensor, at least one communication device, at least one wheel disposed within each of the at least one multiple segments and wherein the wheel includes a magnetic material, wherein the wheel is configured to retract in and out of each of the at least one multiple segments, and wherein rotation of the wheel is configured to generate energy.

18. The well monitoring system of claim 17, wherein the monitoring apparatus is disposed in an abandoned section of the wellbore isolated from fluid communication with any other section of the wellbore.

19. The well monitoring system of claim, 17, wherein the communication device is selected from the group consisting of an inductive coupler, an acoustic transceiver, a vibratory transceiver, an optical transceiver and a wet connector.

20. The well monitoring system of claim 17, wherein the communication device connects to a connector of a bridge plug or packer in the wellbore.

\* \* \* \* \*